June 17, 1952　　　　K. VOLIS　　　　2,601,187
WHEEL ALIGNMENT APPARATUS
Filed April 25, 1949　　　　　　　　　　　　　　　4 Sheets-Sheet 1
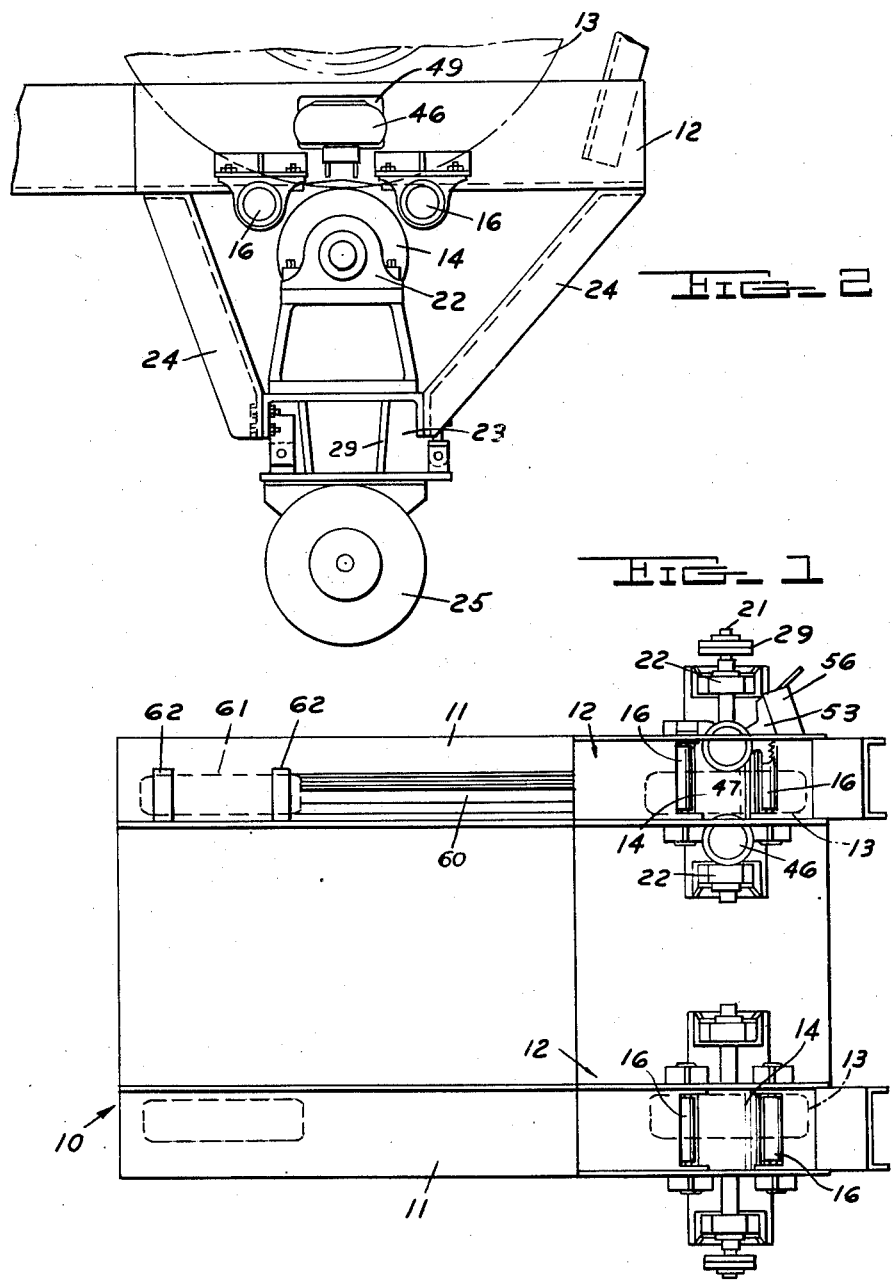
INVENTOR.
KERR VOLIS
BY
Whittemore Hulbert & Belknap
ATTORNEYS

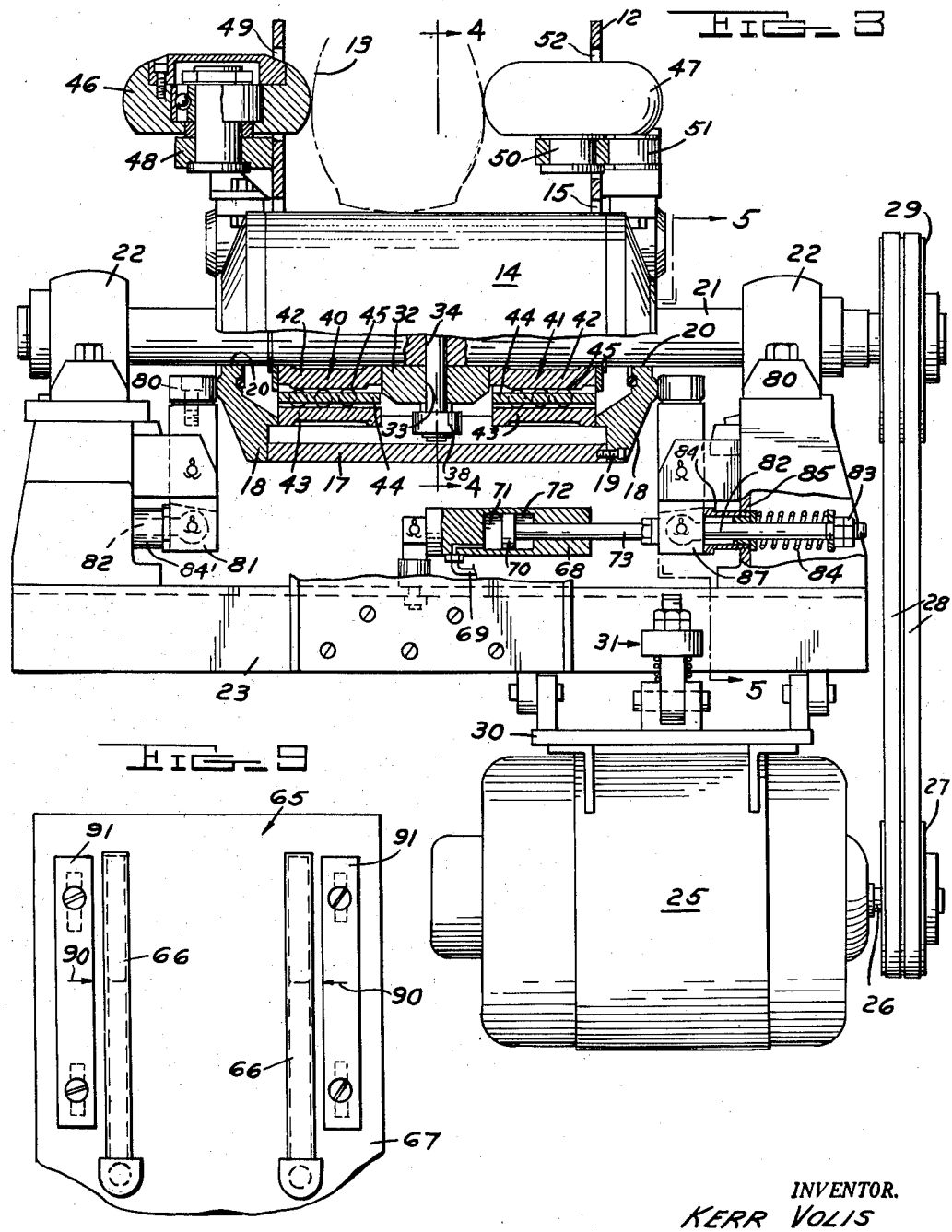

June 17, 1952  K. VOLIS  2,601,187
WHEEL ALIGNMENT APPARATUS
Filed April 25, 1949  4 Sheets-Sheet 3
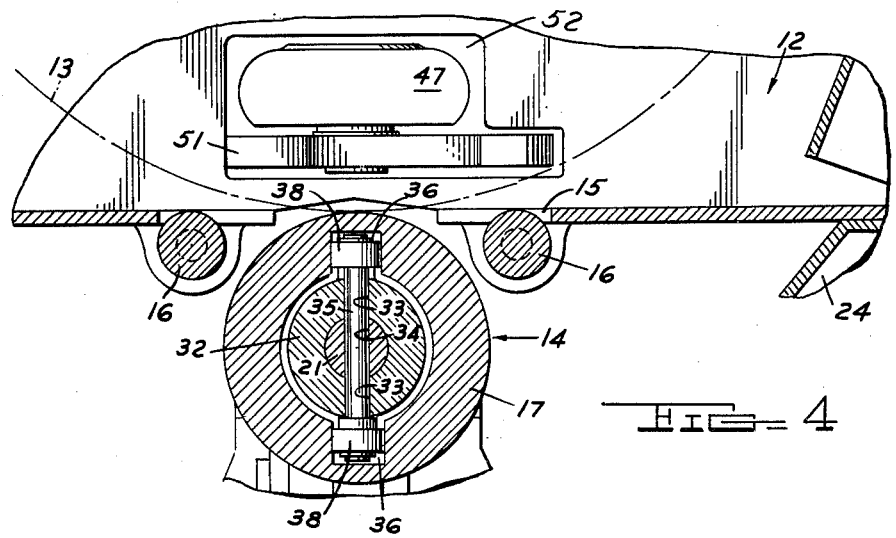
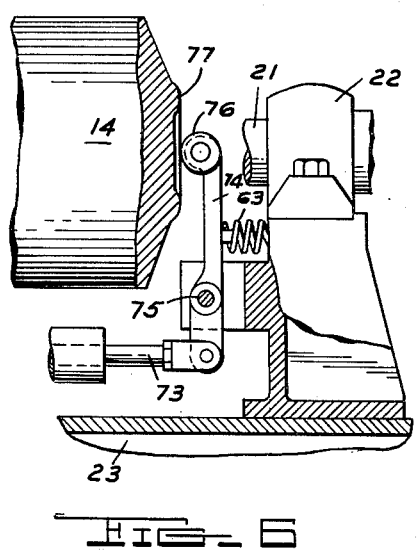
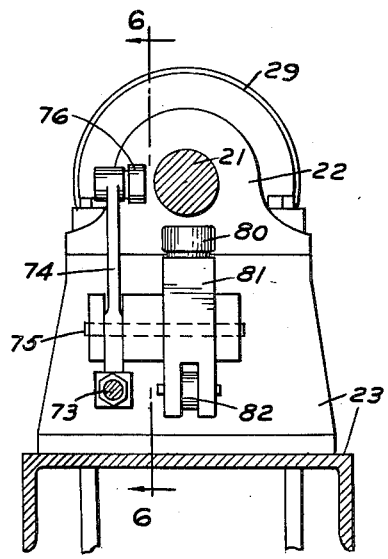
INVENTOR.
KERR VOLIS
BY
Whittemore Hulbert & Belknap
ATTORNEYS

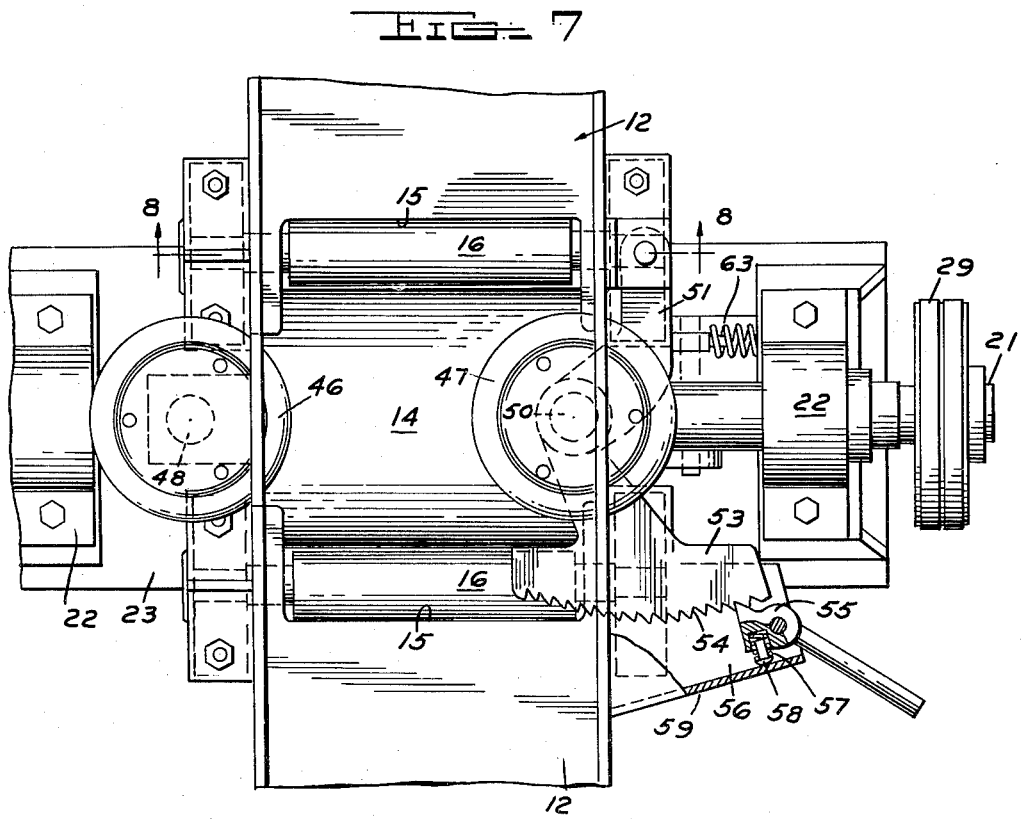
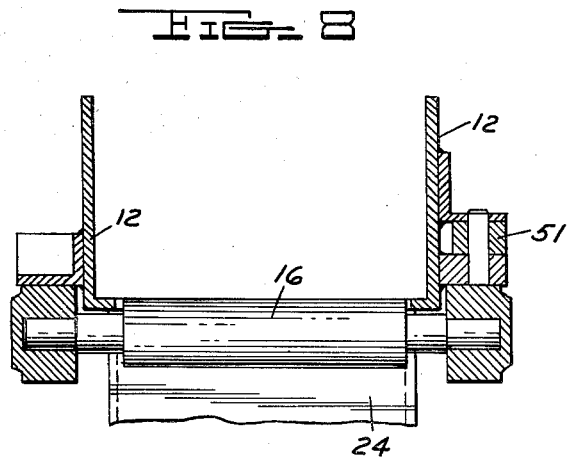

Patented June 17, 1952

2,601,187

UNITED STATES PATENT OFFICE 2,601,187

WHEEL ALIGNMENT APPARATUS

Kerr Volis, Grosse Pointe Park, Mich.

Application April 25, 1949, Serial No. 89,543

12 Claims. (Cl. 33—203.13)

This invention relates generally to apparatus for checking alignment of vehicle wheels and refers more particularly to improvements in gages of the type used for indicating deviation of the front steering wheels of a vehicle from a predetermined plane.

The steering wheels of vehicles are ordinarily supported in planes inclined at an angle depending upon the camber, "toe-in" and caster angles. The angularity of the planes of rotation of the steering wheels is critical in obtaining optimum performance and for the purpose of this description is hereinafter referred to as alignment or "toe-in" of the wheels.

It is one of the objects of this invention to provide a relatively inexpensive gage capable of being readily installed and easily operated to accurately indicate the alignment or "toe-in" of vehicle steering wheels. In accordance with this invention the gage is provided with a ramp or guide for directing a vehicle to a position wherein the steering wheels are operatively associated with the gage.

The invention has as another object to provide a gage having rolls supported in such relationship to the guide or ramp that the wheels at opposite sides of the vehicle are respectively supported by the rolls when the vehicle is in operative relation to the gage. In accordance with this invention the rolls are rotated to impart rotation to the wheels engaged thereby, and are slidable in opposite directions along their respective axes.

It is still another object of this invention to provide a gage of the above type having guiding elements in the form of rollers respectively engageable with opposite sides of the wheel supported on one roll in a manner such that the latter is shifted axially by any deviation of the plane of rotation of the wheel from the vertical. Assuming that the wheel engaged by the roll is a front steering wheel, the extent of axial shifting of the roll depends on the "toe-in" of the wheel and owing to the tie between the steering wheels, it follows that the drum engaged by the wheel at the opposite side of the vehicle is also shifted axially an amount depending on the "toe-in" of the latter wheel.

The invention has as a further object to provide visual indicating means operated by the rolls to enable the operator to determine at a glance the extent the planes of rotation of the wheels engaged by the rolls deviate from the optimum or predetermined plane.

It is a still further feature of this invention to provide means rendering it possible to relatively adjust the guide rollers to vary the distance therebetween and permit accommodating vehicle wheels having pneumatic tires of different sizes.

The foregoing as well as other objects will be made more apparent as this description proceeds, especially when considered in connection with the accompanying drawings, wherein:

Figure 1 is a semi-diagrammatic plan view of a wheel alignment gage embodying the features of this invention;

Figure 2 is a side elevational view of a part of the gage shown in Figure 1;

Figure 3 is an end elevational view of a part of the gage having certain parts broken away for the sake of clearness;

Figure 4 is a sectional view taken on the line 4—4 of Figure 3;

Figure 5 is a sectional view taken on the line 5—5 of Figure 3;

Figure 6 is a sectional view taken on the line 6—6 of Figure 5;

Figure 7 is a fragmentary plan view of the portion of the gage shown in Figure 3;

Figure 8 is a sectional view taken on the line 8—8 of Figure 7; and

Figure 9 is a diagrammatic elevational view of the indicating means.

The gage forming the subject matter of this invention may be advantageously used to indicate alignment of vehicle wheels, and is particularly designed for use in determining the "toe-in" of the front steering wheels of motor vehicles. With the above in view, reference is made more in detail to the drawings, wherein the reference character 10 in Figure 1 designates a ramp having tracks 11 spaced laterally from each other a distance determined to respectively receive the ground engaging wheels at opposite sides of a vehicle. The tracks 11 terminate at the rear ends in channel-shaped sections 12 having a sufficient width to freely receive the pneumatic tires ordinarily installed on the vehicle wheels. In cases where the alignment or "toe-in" of the front steering wheels of the vehicle is to be indicated, the vehicle is driven or propelled along the ramp 10 to a position wherein the front steering wheels 13 respectively engage in the channels 12.

Supported directly beneath each channel 12 is an elongated roll or drum 14 having its axis extending normal to the channel and having a length somewhat greater than the width of the channel. The rolls or drums 14 are in axial alignment, and the diameter of the rolls is such that the top portions thereof respectively project through slots 15 formed in the base portions of the channels 12. As shown in Figure 4 of the drawings the top portions of the rolls or drums 14 lie in a plane which includes the inner surfaces of the base portions of the channels 12, and the length of the slots 15 is such as to enable supporting the front wheels 13 on the respective drums or rolls 14. It will also be noted from Figures 1, 4 and 7 of the drawings that a pair of idler rollers 16 are journalled on each channel 12, and occupy positions in the slots 15 at opposite sides of the rolls or drums 14. The rollers 16 provide auxiliary supports for engagement with the wheels in the event the latter should roll off the drums 14 and prevent any possibility of wedging the pneumatic tires on the wheels in the portions of the slots at opposite sides of the drums.

The construction of the two drums 14, and the manner in which the latter are supported is identical. Consequently a description of one drum and its support will suffice for both, and with this in view, reference is made particularly to Figure 3 of the drawings. In detail each drum comprises a sleeve or cylinder 17 having the opposite ends closed by suitable caps 18. The caps 18 are removably secured in place by studs 19, and are formed with aligned openings 20 therethrough. A shaft 21 extends axially through the aligned openings 20, and is journalled at opposite ends in bearings 22. The bearings 22 are secured to suitable frame structure 23, and the latter is in turn connected to the associated channel 12 by angle braces 24.

The shaft 21 is driven by a suitable electric motor 25 having a drive shaft 26 and having a pulley 27 secured to the drive shaft. A belt 28 connects the pulley 27 to a pulley 29, which is secured to one end of the shaft 21. The motor 25 is secured to a mounting plate 30, and the latter in turn is pivoted on the frame structure 23 for swinging movement to enable varying the dimension on the belt 28. The mounting plate is held in any one of a number of adjusted positions with respect to the supporting structure 23 by means of an adjustable device designated generally by the numeral 31.

The drum or roll 14 is connected to the shaft 21 for rotation as a unit with the latter by the means shown in Figures 3 and 4 of the drawings. In detail a ring 32 is mounted on the shaft 21 intermediate the ends of the drum, and is formed with aligned openings 33. The openings 33 register with a bore 34 formed in the shaft 21 and having its axis extending at right angles to the axis of the shaft 21. A pin 35 projects through the aligned openings 33 and bore 34 in the manner clearly shown in Figure 4 of the drawings. The opposite ends of the pin 35 respectively project into grooves 36 formed in the inner surface of the sleeve 17 at diametrically opposite sides of the latter and extending for substantially the full length of the sleeve 17 in parallel relation to the axis of the drum 14. Suitable rollers 38 are respectively journalled on opposite ends of the pin 35, and engage the opposite side walls of the grooves 36.

It follows from the foregoing that the drum 14 is connected to the shaft 21 in a manner such that it not only rotates as a unit with the shaft, but is also capable of sliding movement in opposite directions axially of the shaft. In order to assure relatively free sliding movement of the drum 14 along the shaft 21, suitable anti-friction means is provided between the drum and shaft. As shown in Figure 3 of the drawings a pair of bearings 40 and 41 are respectively supported within the drum at opposite sides of the ring 32. Each bearing 41 comprises a ring 42 secured to the shaft 21 and a ring 43 suitably secured to the drum. The rings 42 and 43 are in concentric relationship, and are spaced by a ball retaining ring 44. The ring 44 carries a plurality of ball bearings 45 positioned to respectively engage the adjacent surfaces of the concentric rings 42 and 43. Thus the drum 14 is freely slidably mounted on the driving shaft 21.

Supported on one of the channels 12 at opposite sides thereof is a pair of guide rollers 46 and 47. The roller 46 is journalled on a bracket 48 for rotation about an axis perpendicular to the axis of the drum 14, and the bracket 48 in turn is welded or otherwise suitably secured to the inner side flange of the channel 12. As shown in Figure 3 of the drawings, the inner side flange of the channel 12 has a slot 49 through which the roller 46 projects into engagement with the adjacent side of the pneumatic tire on the wheel 13. The roller 47 is journalled on the upper end of a pin 50 having its axis parallel to the axis of rotation of the roller 46 and having the lower end secured to the free end of an arm 51. The other end of the arm 51 is pivoted on the outer flange of the channel 12 at the outer side thereof, and a slot 52 is formed in the outer flange of the channel to permit swinging movement of the roller 47 into engagement with the pneumatic tire on the wheel 13 at a point opposite the point of engagement of the roller 46 with the tire. The roller 47 is held in any one of a number of adjusted positions by means of a ratchet 53 secured to the swinging end of the arm 51 and having a series of teeth 54 engageable by a pawl 55. The pawl 55 is pivoted on a bracket 56 secured to the outer flange of the channel 12, and is normally urged into engagement with the rack teeth by a suitable spring 57. As shown in Figure 7 of the drawings, one end of the spring 57 engages the swinging end of the pawl 55, and the other end of the spring engages a pin 58, which in turn, abuts a flange 59 on the bracket 56. The above construction enables varying the distance between the guide rollers 46 and 47 to accommodate pneumatic tires of different widths.

The front wheel 13 adapted to be engaged by the guide rollers 46, 47 is guided into a position wherein the inner side of the pneumatic tire engages the roller 46 by a generally V-shaped guide 60 shown in Figure 1 of the drawings as secured to the top surface of the track 11 along which the above mentioned wheel 13 is advanced. After the wheel 13 is directed to a position on the drum 14 between the guide rollers, the rear wheel 61 on the same side of the vehicle is blocked from movement in either direction by suitable stops 62. The stops 62 may be in the form of blocks adapted to rest on the adjacent track 11 at the front and rear sides of the wheel 61. When this is accomplished the guide roller 47 is swung inwardly to a position wherein it cooperates with the opposed guide roller 46 to, in effect, clamp the adjacent pneumatic tire therebetween. The clamping action is of a yieldable nature, and for accomplishing this result, a coil spring 63 is provided for normally urging the guide roller 47 inwardly toward the adjacent wheel 13. The guide roller 47, however, is effectively locked in a position wherein it engages the adjacent side of the wheel 13 by the rack 53 and pawl 55.

It will, of course, be understood that when the front wheel 13 of the vehicle is supported on the drum 14 between the guide rollers, the opposite front wheel assumes a position in engagement with the adjacent drum 14. Thus rotation of the drums about their respective axes imparts a rotative movement to the front wheels 13 of the vehicle. Since the front wheels are interconnected in accordance with conventional practice, and since one of the wheels is yieldably gripped between the guide rollers, it follows that the drums 14 are shifted axially of the respective shafts a distance depending on the "toe-in" of the wheels engaging the drums.

The extent of axial movement of the drums 14 by the front wheels 13 may be readily determined by observing an indicator 65. As shown in Figure 9 of the drawings the indicator 65 comprises a pair of manometer tubes 66 supported in vertical positions on a panel 67 which, in turn, is located where it may be readily viewed by the operator. The upper ends of the tubes 66 are open and the lower ends of the tubes are respectively connected to the inner ends of cylinders 68 by conduits 69. A cylinder 68 is associated with each drum 14 and one of the cylinders is shown in detail in Figure 3 of the drawings as having the inner end suitably secured to the supporting structure 23 beneath the associated drum 14. A piston 70 is slidably supported within the cylinder and divides the latter into two chambers 71 and 72. The chamber 71 communicates with the conduit 69 and the chamber 72 is vented to the atmosphere. Also the chamber 71, conduit 69 and manometer tube 66 connected to the conduit are filled with a suitable liquid to be more fully hereinafter referred to. The cylinder assembly associated with the other drum 14 is identical to the one described above, and is therefore, not shown herein. It will suffice to point out that the chamber 71 of this cylinder is connected to the other manometer tube 66 shown in Figure 9 of the drawings.

The piston 70 in each cylinder 68 is secured to the inner end of a rod 73 shown in Figures 6 and 7 as having the outer end pivoted to the lower end of a lever 74. The lever 74 is pivoted intermediate the ends on a part of the frame structure 23 by a pin 75; and a roller 76 is supported on the upper end of the lever in a position to engage an annular bearing 77 on the adjacent end of the associated drum 14. The bearing 77 is concentrically arranged with respect to the axis of the drum, and has a rolling contact with the roller 76.

It follows from the above that the pistons 70 in the cylinders 68 are respectively operated by axial movement of the drums 14 on their respective shafts 21. The two drums are normally yieldably urged to positions on the shafts 21 wherein the pistons 70 are centered within their respective cylinders 68 as indicated in Figure 3 of the drawings. The drums 14 are yieldably held in their normal positions by rollers 80 respectively engageable with opposite ends of each drum and supported on the upper ends of arms 81. The arms 81 are pivoted intermediate the ends on the frame structure 23, and are pivoted at their lower ends on the inner ends of rods 82. The rods 82 extend through openings in adjacent parts 85 of the frame 23 and are threaded at their outer ends for receiving the nuts 83. Suitable coil springs 84 are respectively supported on the rods 82 between the nuts 83 and the frame parts 85 for yieldably urging the rollers 80 toward each other into engagement with opposite ends of the drum. Thus sliding movement of the drums 14 in either direction from their normal positions on the respective shafts 21 is resisted by the springs 84. It is preferred to provide stops 84' for positively limiting inward swinging movement of the rollers 80 at the upper ends of the arms 81. These stops are located between the lower ends of the arms 81 and the parts 85 of the frame 23, and are adjustable to assure normally locating the drums 14 in their center positions.

*Operation*

Assuming that the wheels 13 of a vehicle are respectively supported on the two rolls or drums 14, and that the guide rollers 46, 47 are relatively adjusted to engage opposite sides of a pneumatic tire on one of the wheels 13, it will be noted that rotation of the drums 14 by the shafts 21 imparts a rotative movement to the wheels 13. Inasmuch as one of the wheels 13 is gripped by the guide rollers 46, 47 and since the wheels 13 at opposite sides of the vehicle are interconnected, it follows that any "run-out" or deviation about a vertical axis of the planes of rotation of the respective wheels from planes perpendicular to the axes of the drums supporting the wheels results in the application of an axial thrust on the drums 14. For example the front steering wheels of a vehicle toe-in a predetermined amount and when these wheels are supported on the drums 14, the latter are shifted axially of their respective shafts 21 a distance depending on the extent of toe-in of the wheels.

With the above in view, let it be assumed that the drum 14 in Figure 3 is moved to the right by the wheel 13 supported thereby. As a consequence, the lever 74 (Figure 6) is swung in a clockwise direction about the pivot pin 75, and the rod 73 is moved inwardly to impart a corresponding movement to the piston 70. Inward movement of the piston 70 displaces fluid in the chamber 71, and causes the fluid in the manometer tube 66 connected to the chamber 71 to rise an amount proportional to the extent of axial movement of the drum 14. On the other hand movement of the drum 14 to the left increases the capacity of the chamber 71 in the cylinder, and causes a drop in the level of the fluid contained in the tube 66. The above description is equally applicable to the drum 14 engaged by the opposite wheel 13, although it is to be understood that the two drums operate independently of one another.

In order to facilitate adjusting the vehicle wheels to obtain the specified alignment or "toe-in," reference marks 90 are respectively located adjacent the tubes 66 in positions to designate the level of the liquid in the tubes 66 when the drums 14 are in their normal positions determined by the centering rollers 80 and stops 84'. Thus by noting the rise or fall of the liquid with reference to the marks 90, the operator may quickly determine the condition of the wheels insofar as alignment is concerned, and may readily make the necessary adjustments. The marks 90 are respectively located on plates 91 which are adjustable lengthwise of the tubes 66 to compensate for any slight axial displacement of the drums or rolls 14 during initial setting of the vehicle wheels 13 on the drums. For example the drums 14 may be shifted slightly to the left when swinging the guide roller 47 inwardly to yieldably grip the adjacent wheel between the rollers. Such movement, even though slight, would cause the level of the liquid contained in the tubes 66 to drop with respect to the reference marks, and this discrepancy may be readily compensated for by merely adjusting the plates 91 to bring the reference marks in registration with the liquid level.

What I claim as my invention is:

1. In a gage for indicating alignment of vehicle ground engaging wheels, a supporting frame structure, a supporting roll carried by the frame structure in a position to frictionally engage the periphery of one of the vehicle ground engaging wheels and having its axis extending in the direction of the axis of the ground engaging wheel engaged thereby, means supporting the roll on the frame structure for movement in opposite directions along the roll axis and for rotation about the latter axis, means for rotating the roll to impart rotation to the vehicle wheel engaged thereby, guide rollers respectively engageable with opposite sides of the vehicle wheel engaged by the supporting roll and fixed against movement with the supporting roll whereby rotation of the latter wheel between the guide roller shifts the supporting roll axially an amount depending on the "toe-in" of the wheel, and means for indicating the extent of axial movement of the supporting roll.

2. In a gage for indicating alignment of vehicle ground engaging wheels, a supporting frame structure, a roll carried by the frame structure in a position to frictionally engage the periphery of one of the vehicle ground engaging wheels and having its axis extending in the direction of the axis of the ground engaging wheel engaged thereby, means supporting the roll on the frame structure for movement in opposite directions along the roll axis and for rotation about the latter axis, means for rotating the roll to impart rotation to the vehicle wheel engaged thereby, yieldable means respectively engageable with opposite ends of the roll to position the roll and resist axial displacement of the latter, wheel guiding elements fixed against movement with the roll and engageable with opposite sides of the wheel adjacent the periphery of the latter whereby rotation of the wheel between the guiding elements shifts said roll axially against the yieldable positioning means a distance depending upon the extent of the wheel "run-out," and means for indicating the extent of axial movement of the roll in either direction.

3. In a gage for indicating alignment of vehicle ground engaging wheels, a supporting frame structure, a roll carried by the frame structure in a position to frictionally engage the periphery of one of the vehicle ground engaging wheels and having its axis extending in the direction of the axis of the ground engaging wheel engaged thereby, means supporting the roll on the frame structure for movement in opposite directions along the roll axis and for rotation about the latter axis, means for rotating the roll to impart rotation to the vehicle wheel engaged thereby, yieldable means engageable with the roll to resist axial shifting movement of the roll, a pair of guide rollers respectively engageable with opposite sides of the vehicle wheel engaged by the roll and fixed against movement with the roll whereby rotation of the latter wheel between the guide rollers shifts the roll axially against the action of said yieldable means a distance depending on the extent the plane of rotation of the wheel deviates about a vertical axis from a plane perpendicular to the roll axis, means for relatively adjusting the guide rollers to vary the distance therebetween, and means for indicating the extent of axial movement of the roll in either direction.

4. In a gage for indicating alignment of vehicle ground engaging wheels, a supporting frame structure, a roll in the form of a drum positioned to support a selected wheel of a vehicle and having its axis extending in the direction of the wheel axis, a shaft journalled on the frame structure and extending axially through the drum, anti-friction means slidably supporting the drum on the shaft, a slidable driving connection between the shaft and drum, yieldable means resisting sliding movement of the drum in either direction from a predetermined position on the shaft, means for rotating the shaft, and indicating means operated in response to movement of the drum in either direction axially of the shaft.

5. In a gage for indicating alignment of vehicle ground engaging wheels, a supporting frame structure, a roll in the form of a drum positioned to support a selected wheel of a vehicle and having its axis extending in the direction of the wheel axis, a shaft journalled on the frame structure and extending axially through the drum, anti-friction means slidably supporting the drum on the shaft, a slidable driving connection between the shaft and drum, means for rotating the shaft, and positioning elements supported on the frame structure in positions to respectively engage opposite sides of the vehicle wheel supported by the drum whereby rotation of the wheel between said elements shifts the drum axially of the shaft an amount depending on the extent the plane of rotation of the wheel deviates about a vertical axis from a plane perpendicular to the drum axis.

6. In a gage for indicating alignment of vehicle ground engaging wheels, a supporting frame structure, a roll in the form of a drum positioned to support a selected wheel of a vehicle and having its axis extending in the direction of the wheel axis, a shaft journalled on the frame structure and extending axially through the drum, anti-friction means slidably supporting the drum on the shaft, a slidable driving connection between the shaft and drum, yieldable means resisting sliding movement of the drum in either direction from a predetermined position on the shaft, means for rotating the shaft, rollers supported on the frame structure in positions to respectively engage opposite sides of the vehicle wheel supported on the drum whereby rotation of the wheel by the drum shifts said drum against the action of the yieldable means axially of the shaft an amount depending on the extent the plane of rotation of the wheel deviates about a vertical axis from a plane perpendicular to the drum axis, and means for indicating the extent of axial movement of the drum relative to the shaft.

7. In a gage for indicating alignment of vehicle ground engaging wheels, a supporting frame structure, a roll in the form of a drum positioned to support a selected wheel of a vehicle and having its axis extending in the direction of the wheel axis, a shaft journalled on the frame structure and extending axially through the drum, anti-friction means slidably supporting the drum on the shaft, a slidable driving connection between the shaft and drum, means for rotating the shaft, a pair of rollers fixed against movement with the drum and respectively engageable with opposite sides of the vehicle wheel supported on the drum whereby rotation of the wheel by the drum shifts the latter axially of the shaft an amount depending on the "run-out" of the wheel with respect to a plane perpendicular to the drum axis, means supporting the rollers on the frame structure for relative movement toward and away from each other to vary the distance between the rollers, and an indicator operated by the drum.

8. In a gage for indicating alignment of the ground engaging wheels at opposite sides of a vehicle, a supporting frame structure, a pair of aligned axially spaced rolls positioned to respectively support the ground engaging wheels, means supporting the rolls on the frame structure for rotation and for sliding movement along their aligned axes, means for rotating the rolls to impart rotation to the vehicle wheels, guide elements fixed on the frame structure and respectively engageable with opposite sides of the vehicle wheel supported on one roll whereby rotation of the wheels by said rolls shifts the rolls axially an amount depending on the extent the planes of rotation of the wheels deviate about a vertical axis from planes perpendicular to the axes of the rolls, and means for indicating the extent of axial movement of the rolls.

9. In a gage for indicating the alignment of the front steering wheels of a vehicle, a pair of aligned axially spaced rolls positioned to respectively support the ground engaging wheels, means supporting the rolls for rotation and for sliding movement independently of one another along their respective axes, means for independently rotating the rolls to impart rotation to the vehicle wheels, guide elements fixed against movement with the rolls and respectively engageable with opposite sides of the vehicle wheel supported by one roll whereby rotation of the wheels by the rolls shifts the latter axially an amount depending on the extent the planes of rotation of the wheels deviate about a vertical axis from planes perpendicular to the axes of the rolls of the wheels, means supporting the guide elements for relative adjustment in directions toward and away from one another to vary the distance therebetween, and means for independently indicating the extent of axial shifting movement of the rolls.

10. In a gage for indicating alignment of vehicle ground engaging wheels, a supporting frame structure, a roll carried by the frame structure in a position to frictionally engage the periphery of one of the vehicle ground engaging wheels and having its axis extending in the direction of the axis of the ground engaging wheel engaged thereby, means supporting the roll on the frame structure for movement in opposite directions along the roll axis and for rotation about the latter axis, means for rotating the roll to impart rotation to the vehicle wheel engaged thereby, a lever pivotally supported intermediate the ends on a part fixed against movement with the roll for swinging movement about an axis perpendicular to the roll axis, a roller supported on one end of the lever with its axis extending generally parallel to the axis of pivotal movement of the lever and having a rolling contact with one end of said roll, a fluid displacement device connected to the lever for operation by the latter in response to axial displacement of the roll, and an indicator operated by the displacement device.

11. The gage set forth in claim 10 in which axial shifting movement of the roll in either direction from a predetermined position is resisted by yieldable means acting on said roll.

12. The gage set forth in claim 10 in which the displacement device comprises a cylinder, a piston slidable in the cylinder and connected to the lever for operation by the latter, and a manometer tube having a fluid connection with the cylinder at one side of the piston.

KERR VOLIS.

REFERENCES CITED

The following references are of record in the file of this patent:

UNITED STATES PATENTS

| Number | Name | Date |
| --- | --- | --- |
| 1,609,996 | Evans | Dec. 7, 1926 |
| 1,931,780 | Weaver | Oct. 24, 1933 |
| 1,954,442 | Dall et al. | Apr. 10, 1934 |
| 2,036,653 | Starr | Apr. 7, 1936 |
| 2,070,873 | Stroud | Feb. 16, 1937 |
| 2,114,481 | Taber | Apr. 19, 1938 |
| 2,251,803 | Pummill | Aug. 5, 1941 |
| 2,270,230 | Pearce | Jan. 20, 1942 |
| 2,493,856 | Buhler | Jan. 10, 1950 |

FOREIGN PATENTS

| Number | Country | Date |
| --- | --- | --- |
| 667,075 | France | June 3, 1929 |